The present invention is concerned with an improved temperature controller; in particular, the temperature controller has an operator which responds to temperature to move a lever and a potentiometer wiper to provide a change in an electrical circuit in response to temperature. The potentiometer has a bobbin and wiper wherein the wiper is at such angle with respect to the axis of the bobbin as to provide a more gradual resistance change for a predetermined movement of the wiper. The wiper is reduced in stiffness so a resilient means can provide for a constant loading of the wiper on the winding.

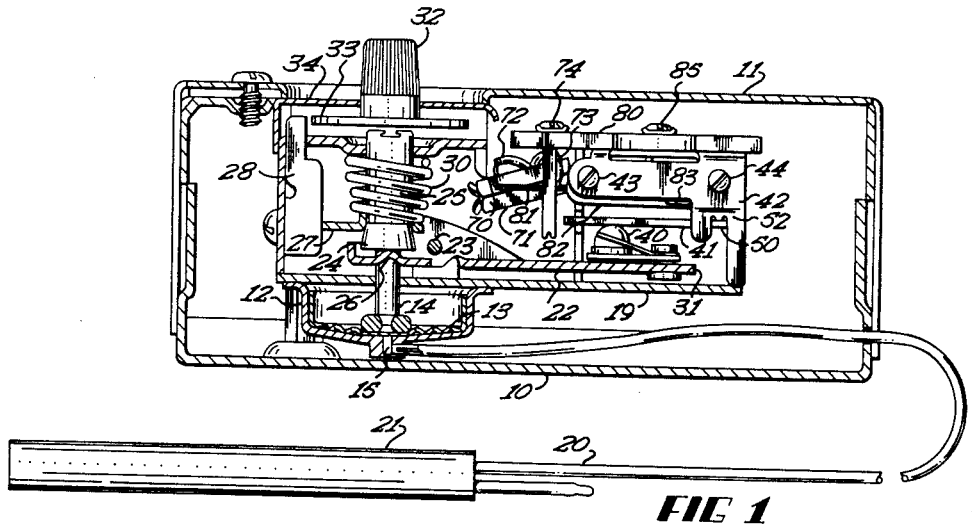
FIG 1
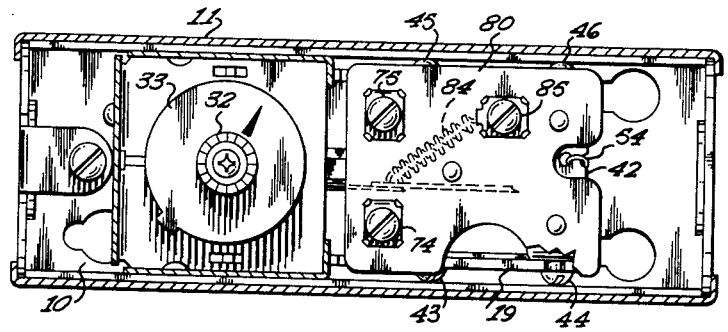
FIG 2
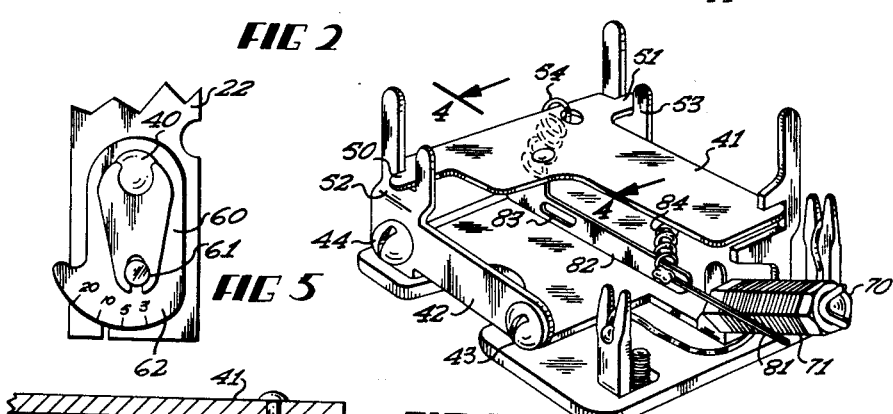
FIG 5
FIG 3
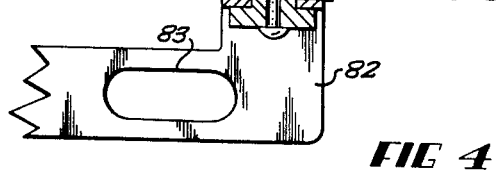
FIG 4
INVENTOR.
JOSEPH A. FRANCIS
BY Clyde C. Blinn
ATTORNEY 3,168,717
CONTROL APPARATUS
Joseph A. Francis, Edina, Minn., assignor to
Honeywell Inc., a corporation of Delaware
Filed Aug. 5, 1963, Ser. No. 299,875
3 Claims. (Cl. 338—31)

Temperature controllers which provide for a change in an electrical circuit in response to temperature as measured by a remote bulb have been available for many years. As the desire to improve the controls becomes more important, certain improvements in such control devices have greatly increased the accuracy and degree of control provided. In a temperature control where a potentiometer is used, a varying electrical resistance signal is obtained by moving the wiper of the potentiometer with a temperature responsive operator.

In the present invention, the novel improvement in the potentiometer has provided for a more accurate and reliable signal device. The potentiometer winding is made up by winding a resistance wire about a hexagonal bobbin. The bobbin is supported so that the associated wiper is at such angle with respect to the axis of the bobbin that the result is a more gradual resistance change for a predetermined amount of movement of the wiper than that heretofore obtained by a wiper substantially perpendicular to the axis of the bobbin. In addition, to maintain an adequate contact between the wiper and the winding which will not unduly load the wiper driving mechanism and still not rely upon the tolerance of certain materials during the manufacture to be within certain close limits, the wiper is biased by a spring attached to the blade so that the resilience of the blade provides substantially none of the pressure of the wiper on the winding.

An object of the present invention is to provide an improved temperature controller having a potentiometer winding wherein the wiper on the winding is at such angle with respect to the winding axis that the resistance changes more gradually for a predetermined movement of the wiper.

Another object of the present invention is to provide a temperature controller with a potentiometer having a wiper pressure which is relatively constant regardless of the material or thickness of the wiper blade.

These and other objects of the present invention will become apparent upon the study of the following specification and drawing of which FIGURE 1 is a side cross-sectional view of the temperature controller showing the operator and the remote bulb.

FIGURE 2 is a top view of the controller of FIGURE 1 showing the terminal board and the wiper tension spring.

FIGURE 3 is a perspective view of the potentiometer of the temperature controller of FIGURE 1.

FIGURE 4 is an enlarged view of a portion of the wiper blade showing the portion removed to decrease the resilience of the member.

FIGURE 5 is a detailed top view of the right hand end of lever 31 as shown in FIGURE 1.

Referring to FIGURE 1, a base member 10 having a cover 11 forms a housing for a temperature controller. Attached to a base member 10 is a conventional operator or actuator 12 comprising a diaphragm 13 on which a screw or shaft 14 rests to move up and down depending upon the position of diaphragm 13. A chamber 15 on the under side of diaphragm 13 is connected by a capillary tube 20 to a remote bulb 21 which forms a fluid filled system so that upon the expansion of fluid in the system when the temperature of bulb 21 increases, diaphragm 13 will be moved upward to lift shaft 14. A lever 22 is pivotally mounted about a shaft 23 on a base 19 attached to base 10. An enlarged portion or shoulder 24 of a nut 25 threaded on shaft 14 moves upward against a bias spring 30. A raised portion 26 of lever 22 engages a lower end of nut 24 so lever 22 is pivoted about shaft 23 when shaft 14 moves upward. A washer 27 between shoulder 24 and spring 30 engages stop 28 and prevents nut 25 from turning when the control point of the device is set by rotating a knob 32 attached to shaft 14. A suitable calibration index is provided by the respective positions of disc 33 which is attached to shaft 14 and a scale plate 34 of base 10.

Mounted on lever 22 at a right hand end 31 is an adjustable connecting means or metal ball 40 which provides the connection between lever 22 and a second lever 41 which is pivotally mounted on a terminal board base member 42 attached by screws 43 and 44 to base member 10. Lever 41 is pivoted about ears 50 and 51 (51 not shown in FIGURE 1) which are supported in cooperating notches 52 and 53 of member 42 when lever 41 is biased by a spring 54 connected to member 42.

When lever 22 moves counter-clockwise to lift end 31 as shown in FIGURE 1, lever 41 is pivoted clockwise through the connection means 40. The amount of movement of lever 41 for a given movement of lever 22 determines the "throttling range" of the device as will be explained later. The "throttling range" adjustment is shown in more detail in FIGURE 5. A member 60 which is attached to lever 22 by shaft 61 supports ball 40 which is held in position by a spring 62. When member 60 is rotated clockwise with respect to shaft 61, ball 40 is moved farther to the right end of lever 22 as shown in FIGURE 1 to increase the length of the effective lever arm of lever 22 and decrease the effective length of the lever arm of lever 41. For the same amount of angular movement of lever 22, a greater amount of movement of lever 41 is then obtained. By means of an appropriate calibration scale 62 on member 60 as shown in FIGURE 5, the "throttling range" can be selected.

Attached to base member 42 is a bobbin 70 having a resistance winding 71 wound about the periphery of bobbin 70. The ends of winding 71 are connected by wires 72 and 73 to associated terminals 74 and 75 (75 not shown in FIGURE 1) attached to a terminal board 80 made of electrical insulating material. Board 80 is mounted on base 42. A wiper 81 is associated with winding 71 to form a potentiometer. Wiper 81 is attached to a lever 82 which is mounted at an opposite extremity on lever 41 whereby upon movement of lever 41 upward, wiper 81 is moved across winding 71.

The axis of bobbin 70 is mounted at an angle less than 90 degrees with respect to wiper 81. Since two straight lines or two cylinders which are not parallel can touch only at one point, wiper 81 engages only one wire of winding 71 at a time (or two adjacent wires if the wiper happens to be exactly in the middle between two wires). This would be true no matter how large the diameters of bobbin and wiper providing the wiper and the outermost surface of the winding were perfect cylinders. Imperfections might cause the wiper 81 to fail to contact some turns on winding 71. This possibility is reduced if the diameters of the cylinders are small. For this reason, bobbin 70 is hexagonal in shape. The contacting surface between wiper and bobbin is along one of the corners of the hexagon where the radius of the winding is small.

Member 82 has a hole 83 therein to reduce the cross-sectional material of the member, and thus its strength. Member 82 is biased so wiper 81 engages winding 71 by a spring 84 which is attached between member 82 and one of the terminals 85 of board 89 to provide the electrical connection to the wiper 81.

*Operation*

Referring to FIGURE 1, the temperature controller is shown with the wiper 81 of the potentiometer contacting winding 71 at the upper end of bobbin 70. Upon an increase in the temperature of bulb 21 to increase the volume of the liquid in this liquid filled system, diaphragm 13 is moved upward to lift shaft 14 and pivot lever 22 in a clockwise direction. Lever 41 is lowered and wiper 81 moves downward across winding 71. The electrical resistance between the wiper and either one of the two ends of the winding which is available between terminal 85 and either terminal 74 or 75 changes. Since wiper 81 is at an acute angle to the bobbin axis, more loops of the winding 71 are successively engaged for a given wiper movement than would be the case if the wiper were perpendicular to the axis of the bobbin. The change in resistance as the wiper 81 moves is very gradual and a more refined resistance controller is obtained.

The pressure or loading of member 81 on winding 71 determines the force needed to move the mechanism. By reducing the cross-sectional area of member 82 by the hole 83, the loading of wiper 81 on winding 71 is not particularly determined by the resiliency of member 82. The loading of wiper 81 on the winding and thus the force needed to move the wiper is determined by the strength of spring 84 which also accomplishes the electrical connection between wiper 81 and terminal 85.

To adjust the set point of the controller, knob 32 is rotated to reposition screw 14 in nut 25 and thereby determine the distance between the raised portion 24 and diaphragm 13. A suitable index 34 cooperates with a marking on disc 33 to indicate the set point for a given position of knob 32.

The "throttling range" or the change in resistance as determined by the movement of wiper 81 across winding 71 for a given change in temperature of the bulb 21 is adjusted by moving lever 60 of FIGURE 5 to select a "throttling range" as determined by the index 62.

While the invention has been described in one particular manner, the intent of the applicant is to limit the scope of the invention only by the scope of the following claims in which I claim:

1. In a temperature controller,
 a base member,
 a diaphragm type operator attached to said base member and having a capillary tube for connecting thereto to form a sealed fluid filled system, said operator having an output member moving upward upon an expansion of the fluid in said system as the temperature of said bulb increases,
 a first lever pivotally supported on said base member and having one end engaging said output member to provide a clockwise movement of said first lever upon said increase in temperature,
 a second lever pivotally attached to said base member,
 an adjustable connection means connecting another end of said first lever and one end of said second lever, said connection means comprising a metal ball providing a low friction contact between said levers,
 a member attached to said first lever for holding said ball so the position of said ball determines the contact point and thus the effective lever length of said first and second levers,
 a hexagonal elongated bobbin having a resistance winding wound thereon,
 means mounting said bobbin on said base,
 a wiper for engaging said winding,
 a blade attached to said wiper and connected to said second lever, said wiper engaging said resistance winding on said bobbin at an acute angle with respect to a longitudinal axis of said bobbin, said blade having a portion removed to reduce the resiliency of said blade,
 a spring attached to said blade and said base to bias said wiper against said winding on said bobbin,
 a terminal board mounted on said base having a plurality of terminals,
 circuit connecting means including said spring for connecting said wiper to one of said terminals,
 and circuit means connecting at least one end of said winding to another of said terminals whereby a signal of variable resistance exists between said terminals indicative of the temperature of said bulb.

2. In a temperature controller,
 a base member,
 an operator attached to said base member having an output indicative of space temperature,
 a first lever pivotally supported on said base member in response to said output to provide a clockwise movement of said first lever upon said increase in temperature,
 a second lever pivotally attached to said base member,
 an adjustable throttling range connection means connecting one end of said first lever and one end of said second lever, said connection means comprising a member attached to one of said levers to provide an adjustable connection between said levers to change the effective length of said levers,
 an elongated bobbin having a resistance winding wound thereon,
 means mounting said bobbin on said base,
 a wiper blade connected to said second lever, said wiper blade engaging said resistance winding on said bobbin at an acute angle with respect to the longitudinal axis of said bobbin,
 and a spring attached to said blade and said base to bias said wiper against said winding on said bobbin.

3. In a temperature controller,
 a base member,
 an operator attached to said base member having an output indicative of space temperature,
 a first lever pivotally supported on said base member, said lever being connected to said operator to respond to said output to provide a clockwise movement of said first lever upon said increase in temperature,
 a second lever pivotally attached to said base member,
 an adjustable throttling range connection means connecting one end of said first lever and one end of said second lever, a metal ball, said connection means comprising a member attached to one of said levers for supporting said metal ball, said member being movable to reposition said metal ball to provide an adjustable, low friction contact between said levers, an elongated bobbin having a resistance winding wound thereon, means mounting said bobbin on said base, and a wiper blade connected to said second lever, said wiper blade engaging said resistance winding on said bobbin to provide an electrical output indicative of the space temperature.

References Cited by the Examiner

UNITED STATES PATENTS

| | | | |
|---|---|---|---|
| 1,993,687 | 3/35 | Shivers | 338—31 |
| 2,617,912 | 11/52 | Colvin | 338—31 |

FOREIGN PATENTS 959,473   10/49   France.

RICHARD M. WOOD, *Primary Examiner*.